United States Patent Office 3,235,621
Patented Feb. 15, 1966

3,235,621
GRAFT COPOLYMER OF COPOLYMERIC ACRYLAMIDE-ACRYLIC ESTER WITH A MONOMERIC MIXTURE
Harry Burrell and Herbert Behr, Cincinnati, Ohio, assignors to Interchemical Corporation, New York, N.Y., a corporation of Ohio
No Drawing. Filed Feb. 27, 1962, Ser. No. 176,107
16 Claims. (Cl. 260—855)

This invention relates to new and useful polymeric materials made by addition polymerization and to coating compositions containing these new materials. More particularly, it relates to new graft copolymers in which styrene or vinyl toluene has been incorporated into preformed addition polymers by graft polymerization.

The novel graft copolymers of this invention are particularly useful in that they may be blended with amine-aldehyde resins in organic solvents to produce very durable surface coatings which are relatively inexpensive, exhibit excellent resistance to scratching, staining, washing, and detergents, are flexible and display good adhesion to surfaces, especially metal surfaces.

Further, because of the large quantities of styrene which may be incorporated into the novel copolymer of this invention, such coating compositions may be produced at relatively low cost.

The novel graft copolymers of this invention comprise the addition polymerization product of monomeric styrene in the presence of a preformed addition copolymer comprising acrylamide and acrylic ester structural units having the formula:

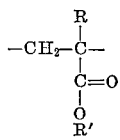

where R is a member selected from the group consisting of hydrogen, the methyl group and the ethyl group, and R' is an alkyl radical containing from 1 to 8 carbon atoms.

The resulting copolymers are thermoplastic and are soluble in organic solvents. While the graft coploymers may be employed in compositions for molding and in fibers, at present these polymers have their greatest utility in coating compositions. When blended with amine-aldehyde resins it is advantageous that an acrylic acid, preferably methacrylic acid be copolymerized with the styrene in the presence of the preformed copolymer. It is most preferable that from 1 to 16 parts of methacrylic acid be incorporated based on the total weight of the graft copolymer.

The copolymers of this invention will be more fully described in the following specification and claims, in which all proportions are by weight unless otherwise stated.

The term "graft copolymers" as used in this specification should be defined here and distinguished from random copolymers. The term "random copolymers" as used in this specification covers the reaction products obtained by the addition polymerization of a mixture of two or more ethylenically unsaturated, monomeric compounds. The resultant copolymers contain polymerized monomeric groupings of the monomers present distributed within the molecule in a regular or random manner.

In contrast, "graft copolymers" cover polymeric products obtained by addition polymerization of a mixture of two or more monomers in the presence of a preformed polymer, in such a manner that the monomeric units copolymerize to form attached or grafted side chains or branches, on the preformed polymer. The important structural characteristic of graft copolymers is that the composition of monomers constituting the backbone may be different from those constituting the branches.

Without absolute commitment on the theory involved, it is believed that, by means of chain transfer mechanism, centers are activated along the main preformed copolymer backbone. This results in the relocation of the free radical source at these centers and the consequent generation of branch copolymers by the polymerization of the monomers capable of being polymerized by a free radical mechanism from these centers.

The preformed copolymer of acrylic esters and acrylamide which serves as the backbone may be made by conventional addition copolymerization methods. It is most preferable that the preformed copolymer contain from about 4 to 50 parts of acrylic ester for each part of acrylamide. While for the purposes of illustrating this invention, we have primarily used butyl acrylate and ethyl hexyl acrylate for our acrylic ester components, we do not intend to limit the practice of our invention to these two components. It will be obvious to those skilled in the art that related acrylic ester homologs of the class described above and having alkyl radicals of 1 to 8 carbon atoms such as methylmethacrylate or ethyl acrylate may readily be used. In addition, any of a wide variety of ethylenically unsaturated monomers which are conventionally copolymerizable with acrylamide may be included in this preformed copolymer. Such ethylenically unsaturated monomers include nitriles of acrylic and methacrylic acids; vinyl halides; styrene and vinyl toluene; maleic acid and esters thereof; vinyl esters, vinyl acetones, particularly methyl ethyl ketone; dibutyl maleate, and vinyl pyridines among others.

In the practice of this invention, both the copolymerization of preformed or backbone copolymer and the copolymerization of the graft copolymer are initiated by catalysts or polymerization initiators of the free radical type. The most commonly used initiators are azo compounds and organic peroxygen compounds. Typical of the azo compounds that may be used for this purpose are azobisisobutyronitrile and azobisisovaleronitrile. Typical of the organic peroxygen compounds that may be advantageously used as copolymerization initiators are such compounds as tertiary butyl perbenzoate, peracetic acid, acetyl peroxide, perbenzoic acid, benzoyl peroxide, lauroyl peroxide, stearoyl peroxide, ditertiary butyl peroxide and tertiary butyl peroxide.

The styrene preferably constitutes from 30 to 90% of the total graft copolymer weight. The styrene may be replaced in whole or in part by vinyl toluene.

It has been found that adhesion of coating compositions containing the novel graft copolymer of this invention may be improved to some extent by the inclusion of 2-hydroxymethyl-5-norbornene as a component in the side chain. When included, the 2-hydroxymethyl-5-norbornene preferably constitutes up to 10% of the graft copolymer weight. In addition to these monomers, the side chain may also contain ethylenically unsaturated monomers including acrylic esters such as methyl methacrylate, butyl acrylate and ethyl hexyl acrylate, glycolmethacrylate, acrylamide and vinyl alkyl ether.

The graft copolymers are soluble in such solvents as xylene, benzene, ethyl benzene, toluene, aromatic petroleum naphthas, lower aliphatic alcohols, ketones and ethers.

The graft copolymers of this invention show good pigment wetting power which makes easy the dispersion of pigments such as carbon black, titanium dioxide, phthalocyanines, etc. in vehicles containing these copolymers.

Highly desirable thermosetting coating compositions may be made by blending the novel copolymers of this invention with amine-aldehyde resins in solutions of organic solvents. Amine-aldehyde resins are made by reaction of an aldehyde (preferably formaldehyde) with a polyfunctional amine, such as urea, biuret, dicyandiamide, and triazines such as ammeline, melamine, substitute melamines, benzoguanamine, etc.

These resins are available commercially under trade names such as Uformite, Beckamine, Resimene, Aerotex, Cymel and Beetle. Suitable amine-aldehyde resins include urea-formaldehyde resins, e.g., Beckamine P196, Beetle 227–8 and Uformite F200E as well as resins made by the reaction of aldehydes and triazines of the classes described hereinabove, e.g., butylated benzoguanamine-formaldehyde resins marketed under the trademark Uformite MX 61, or Resimene 879, an octylated melamine-formaldehyde resin.

Preferably ratios by weight on a solids basis in the range from 1:1 to 49:1 graft copolymer:amine-aldehyde are used.

The following examples will illustrate this invention:

*Example 1*

A mixture of 189 g. of butyl acrylate, 47 g. of acrylamide, 158 g. of butanol, 50 g. of Methyl Cellosolve, 81 g. of xylol and 1 g. of tertiary butyl perbenzoate is heated to reflux at 254° F. and maintained at said temperature for 1 hour after which 2.5 g. of tertiary butyl perbenzoate are added and the mixture is maintained at 254° F. for 1 hour. While the mixture is maintained at 255° to 260° F., a mixture of 157 g. methacrylic acid, 1260 g. styrene, 149 g. 2-hydroxymethyl-5-norbornene, 20 g. tertiary butyl perbenzoate and 911 g. of xylol is added over a period of 2 hours. After another 2 hours at reflux, 600 g. of xylol and 10 g. of tertiary butyl perbenzoate are added. The mixture is maintained at reflux for another 2 hours, after which another 10 g. of tertiary butyl perbenzoate are added and the mixture maintained at reflux for 1½ hours. The mixture is allowed to cool and 600 g. of xylol are added. The product graft copolymer solution has a viscosity of X (Gardner-Holdt Scale) and a solids content of 43.3% by weight.

The solution is compatible with amine-aldehyde resins. It is blended with Uformite MX 61, a butylated benzoguanamine-formaldehyde resin in the weight ratio solids basis of 7 parts of graft copolymer to 3 parts of said resin. Black iron panels are coated with the blend and then baked at 325° F. for 15 minutes. The resulting films are hard and flexible, have excellent adhesion and display good mar, solvent, detergent and water resistance.

*Example 2*

Example 1 is repeated using the same ingredients, proportions and conditions except that 2-hydroxymethyl-5-norbornene is eliminated from the original monomer mixture. The resulting baked film is hard and flexible, has good adhesion and displays good mar, solvent, detergent and water resistance.

*Example 3*

A mixture of 378 g. butyl acrylate, 94 g. acrylamide, 316 g. butanol, 100 g. Methyl Cellosolve, 162 g. xylol and 2 g. tertiary butyl perbenzoate is heated to reflux at 247° C. and maintained at said temperature for one hour after which 2.5 g. of tertiary butyl perbenzoate is added and the mixture is maintained at reflux for one additional hour. A mixture of 157 g. methacrylic acid, 1173 g. styrene, 20 g. tertiary butyl perbenzoate and 911 g. of xylol are then added over a period of 2 hours while the mixture is maintained at reflux. After an additional 2 hours at reflux 10 g. of tertiary butyl perbenzoate and 600 g. of xylol are added and the mixture is maintained at reflux for 2 more hours. Then 310 g. of xylol are added.

The resulting solution contains 43.2% by weight of graft copolymer and has a viscosity of Z2–Z3 (Gardner-Holdt Scale). It is blended with Uformite MX 61, a butylated benzoguanamine-formaldehyde resin the weight ratio solids basis of 7 parts of graft copolymer to 3 parts of said resin. Black iron panels are coated with the blend and then baked at 325° F. for 15 minutes. The resulting films are hard, have good mar, solvent, detergent and water resistance and improved flexibility over the film of Examples 1 and 2.

*Example 4*

Example 2 is repeated using the same ingredients, proportions and conditions except that ethylhexyl acrylate is employed in place of butyl acrylate. The resulting baked film has properties similar to those of the film produced in Example 2.

*Example 5*

Example 2 is repeated using the same ingredients, proportions and conditions except that vinyl toluene is employed in place of styrene. The resulting baked film has properties similar to those of the film produced in Example 2.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A novel graft copolymer comprising the addition polymerization product of
   (A) a monomeric mixture comprising
      (1) a member selected from the group consisting of styrene and vinyl toluene and
      (2) an acrylic acid, said member comprising from 30% to 90% of the graft copolymer weight and
   (B) a preformed addition copolymer comprising the copolymerization product of
      (1) acrylamide
      (2) acrylic ester structural units having the formula:

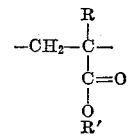

where R is a member selected from the group consisting of hydrogen, the methyl group and the ethyl group, and R' is an alkyl radical containing from 1 to 8 carbon atoms, from 4 to 50 parts by weight of the acrylic ester units being present in the preformed polymer for each part of acrylamide.

2. The graft copolymer of claim 1, wherein said acrylic acid is methacrylic acid and said monomeric member is styrene.

3. The graft copolymer of claim 2, wherein said monomer mixture further includes 2-hydroxymethyl-5-norbornene.

4. The graft copolymer of claim 2, wherein said acrylic units are butyl acrylate.

5. The graft copolymer of claim 2, wherein said acrylic units are ethylhexyl acrylate.

6. A surface coating composition comprising a volatile organic solvent solution of the copolymer defined in claim 1.

7. A surface coating composition comprising a volatile organic solvent solution of the copolymer defined in claim 2.

8. A surface coating composition comprising a volatile organic solvent solution of the copolymer defined in claim 3.

9. A surface coating composition comprising a volatile organic solvent solution of the copolymer defined in claim 5.

10. A surface coating composition comprising a volatile organic solvent solution of the copolymer defined in claim 5.

11. A heat curable surface coating composition comprising a volatile organic solvent solution of the copolymer of claim 1 and an organic solvent soluble thermosetting amine-aldehyde resin.

12. A heat curable surface coating composition comprising a volatile organic solvent solution of the coplymer of claim 2 and an organic solvent soluble thermosetting amine-aldehyde resin.

13. A heat curable surface coating composition comprising a volatile organic solvent solution of the copolymer of claim 3 and an organic solvent soluble thermosetting amine-aldehyde resin.

14. A heat curable surface coating composition comprising a volatile organic solvent solution of the copolymer of claim 4 and an organic solvent soluble thermosetting amine-aldehyde resin.

15. A heat curable surface coating composition comprising a volatile organic solvent solution of the copolymer of claim 5 and an organic solvent soluble thermosetting amine-aldehyde resin.

16. A method of preparing novel graft copolymers which comprises the addition polymerization of a monomeric mixture comprising
(1) a member selected from the group consisting of styrene and vinyl toluene and
(2) an acrylic acid, said member comprising from 30% to 90% of the graft copolymer weight in the presence of an addition polymerization initiator and a preformed addition copolymer comprising the copolymerization product of (1) acrylamide and (2) acrylic ester structural units having the formula

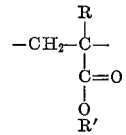

where R is a member selected from the group consisting of hydrogen, the methyl group and the ethyl group, and R' is an alkyl radical containing from 1 to 8 carbon atoms, from 4 to 50 parts by weight of the acrylic ester units being present in the preformed polymer for each part of acrylamide.

References Cited by the Examiner
UNITED STATES PATENTS 3,026,293  3/1962  Caldwell et al. _____ 260—878
3,035,008  5/1962  Gaylord _____ 260—855

MURRAY TILLMAN, *Primary Examiner.*

LEON J. BERCOVITZ, *Examiner.*